(12) United States Patent
Wallner et al.

(10) Patent No.: US 7,725,647 B2
(45) Date of Patent: *May 25, 2010

(54) MEMORY ARRANGEMENT HAVING EFFICIENT ARRANGEMENT OF DEVICES

(75) Inventors: Paul Wallner, Prien (DE); Tim Schoenauer, Feldkirchen (DE); Peter Gregorius, Munich (DE); Daniel Kehrer, Munich (DE)

(73) Assignee: Qimonda AG, Munich (DE)

( * ) Notice: Subject to any disclaimer, the term of this patent is extended or adjusted under 35 U.S.C. 154(b) by 552 days.

This patent is subject to a terminal disclaimer.

(21) Appl. No.: 11/679,732

(22) Filed: Feb. 27, 2007

(65) Prior Publication Data
US 2007/0201296 A1  Aug. 30, 2007

(30) Foreign Application Priority Data
Feb. 27, 2006  (DE) ............... 10 2006 009 026

(51) Int. Cl.
*G06F 12/00* (2006.01)
*G06F 13/00* (2006.01)
(52) U.S. Cl. ............... 711/105; 711/104; 711/154
(58) Field of Classification Search ............... 711/104, 711/105, 154
See application file for complete search history.

(56) References Cited

U.S. PATENT DOCUMENTS

| 4,833,657 | A | * | 5/1989 | Tanaka | 365/230.04 |
| 6,104,657 | A | * | 8/2000 | Haga | 365/222 |
| 6,603,683 | B2 | * | 8/2003 | Hsu et al. | 365/189.04 |
| 2004/0230743 | A1 | | 11/2004 | Ware et al. | |
| 2005/0097264 | A1 | | 5/2005 | Park et al. | |
| 2005/0180255 | A1 | | 8/2005 | Tsern et al. | |

OTHER PUBLICATIONS

Crisp, Richard, "Direct Rambus Technology: The New Main Memory Standard," IEEE Micro, pp. 18-28 (Nov./Dec. 1997.

* cited by examiner

*Primary Examiner*—Mardochee Chery
(74) *Attorney, Agent, or Firm*—Dicke, Billig & Czaja, PLLC

(57) ABSTRACT

A memory arrangement includes an interface configured to transmit data in the form of data packets according to a predefined protocol. The memory arrangement includes at least two memory banks. Each memory bank includes at least one memory cell. The memory arrangement includes at least two memory bank access devices configured to facilitate accessing the data of the at least one memory cell of each of the at least two memory banks. The memory arrangement includes at least two data packet processing devices configured to encode and/or decode the data packets. The at least two data packet processing devices are assigned to different memory bank access devices.

23 Claims, 4 Drawing Sheets

MEMORY ARRANGEMENT HAVING EFFICIENT ARRANGEMENT OF DEVICES

CROSS-REFERENCE TO RELATED APPLICATIONS

This Utility patent application claims priority to German Patent Application No. DE 10 2006 009 026.8, filed on Feb. 27, 2006, which is incorporated herein by reference.

BACKGROUND

In many modern memory arrangements for computer systems and other electronic data processing systems the memory arrangement is not controlled as in typical traditional memory arrangements via parallel application of data, address and control signals, but via data packets which are transmitted at high speed and high frequency according to a predefined protocol between, for instance, a computer system and an interface of the memory arrangement. These data packets can contain write data, read data, addressing data, and command data.

Data packets which are sent, for instance, from a computer system to the memory arrangement can be structured in such a way that a data packet consists of a specified number of bits, which are transmitted via multiple parallel lines. The number of parallel lines can be less than the number of bits of a data packet. This is possible in that multiple successive bit groups are transmitted via parallel lines and then combined into a data packet. Thus, for example, data packets with a length of 54 bits can be transmitted via six lines, in nine successive six-bit groups.

SUMMARY

One embodiment provides a memory arrangement including an interface configured to transmit data in the form of data packets according to a predefined protocol. The memory arrangement includes at least two memory banks. Each memory bank includes at least one memory cell. The memory arrangement includes at least two memory bank access devices configured to facilitate accessing the data of the at least one memory cell of each of the at least two memory banks. The memory arrangement includes at least two data packet processing devices configured to encode and/or decode the data packets. The at least two data packet processing devices are assigned to different memory bank access devices.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 3:
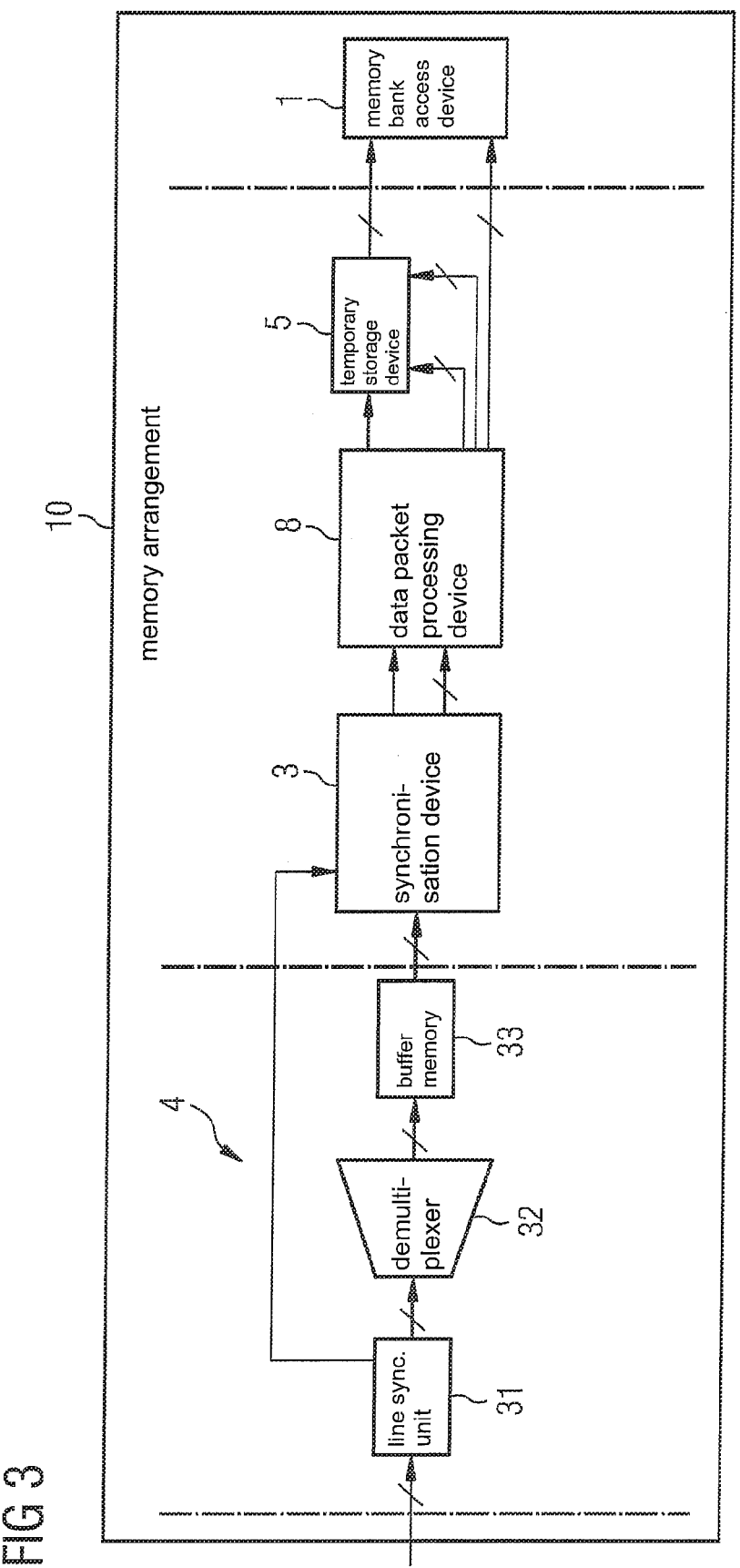
FIG. 3 illustrates in block diagram form functional units of one embodiment of a memory arrangement.

FIG. 3 illustrates schematically the functional blocks of a receive unit for an embodiment of a memory arrangement. An interface 4 includes, for instance, six line synchronisation units 31, each of which synchronizes itself onto the data stream of a line. For each line, this is followed by temporal demultiplexing and thus a first parallelisation of the data using the demultiplexer 32, to reduce the data transmission rates. The data which is prepared in this way is stored temporarily in buffer memories 33, which may be in the form of first in first out (FIFO) memories. A synchronisation device 3 of the memory arrangement takes the data out of the buffer memories 33 and combines the data into a 54-bit data packet. The data which is regained and parallelized in this way is transmitted via 54 data lines to a data packet processing device 8. The data packet processing device 8 interprets and processes the received data according to a predefined protocol. In comparable fashion, read data from the data packet processing device is encoded into data packets and transmitted via the interface 4 to, for example, a computer system. An advantage of this transmission method is that fewer lines are present between, for instance, the computer system and the memory arrangement. Each individual line is suitable for transmitting the significantly higher data rate.

Such a memory arrangement includes multiple memory banks, which are accessible via multiple memory bank access devices and which have multiple memory cells.

Figure 2:
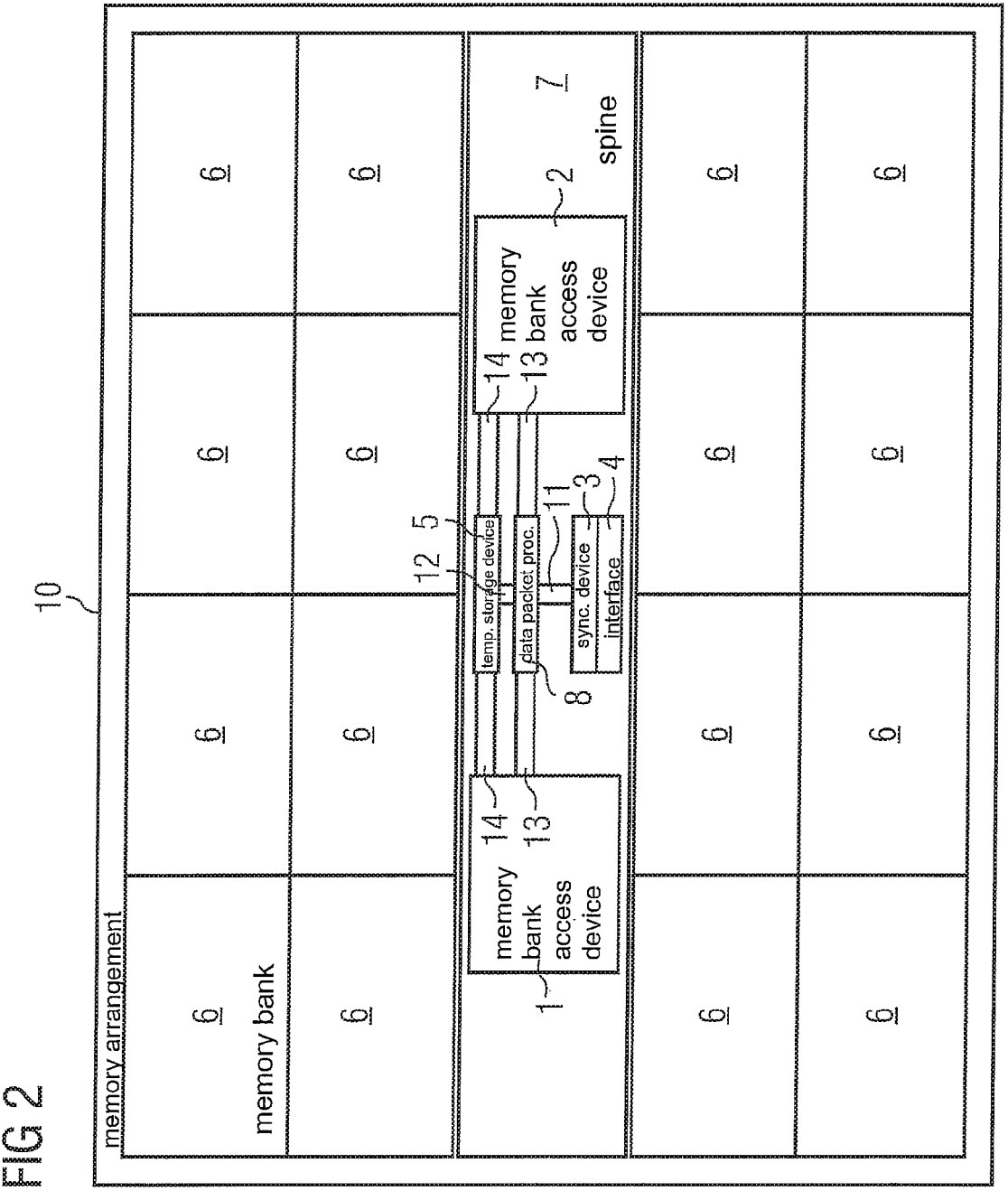
FIG. 2 is a schematic plan view of one embodiment of a memory arrangement with only one data packet processing device.

For instance, a memory arrangement 10 embodiment illustrated in FIG. 2, can comprise sixteen memory banks 6 arranged in a four by four matrix. In a plan view of the memory arrangement 10 illustrated in FIG. 2, eight upper memory banks 6 are arranged at a distance from eight lower memory banks 6, so that a strip-shaped area 7, also referred to as a spine, is formed between the upper eight memory banks 6 and the lower eight memory banks 6. The sixteen memory banks 6 are also divided into two groups each of eight memory banks, in which case, with reference to FIG. 2, a left-hand group includes the eight memory banks on the left in plan view, and a right-hand group includes the eight memory banks on the right in plan view. An access to one of the memory banks 6 of the left-hand group takes place via a first memory bank access device 1, and an access to one of the memory banks 6 of the right-hand group takes place via a second memory bank access device 2. The interface 4, the memory bank access devices 1 and 2, the synchronisation device 3, the data packet processing device 8, a temporary storage device 5 and other devices of the memory arrangement, (e.g., a clock supply (not shown)), are arranged in the spine 7. The interface 4, synchronisation device 3, data packet processing device 8 and temporary storage device 5 are substantially arranged in the center of the longitudinal direction of the spine 7. The interface 4 and synchronisation device 3 are arranged closely adjacently to each other, because the data rate on the connecting lines between the interface 4 and synchronisation device 3 is very high. The synchronisation device 3 and data packet processing device 8 are connected to each other via connecting lines in an area 11. The temporary storage device 5 is connected via connecting lines in an area 12 to the data packet processing device 8. The first memory bank access device 1 is substantially arranged in the center of a left-hand half of the spine 7, and the second memory bank access device 2 is substantially arranged in the center of a right-hand half of the spine 7. The memory bank access devices 1 and 2 are each connected both to the data packet processing device 8 and to the temporary storage device 5 via connecting lines in areas 13 and 14.

The data packets which are received from the interface 4 are parallelized in the synchronisation device 3 and decoded by the data packet processing device 8. Depending on the content of the data packet, the data packet processing device 8 either controls the memory bank access devices 1 and 2 directly or stores write data in the temporary storage device 5. Such an arrangement within the spine can make an even control behaviour over time of the individual memory banks possible. In the case of a different number of memory banks and/or memory bank access devices, correspondingly optimised arrangements can be chosen.

In one embodiment, to keep the cost of producing a memory chip as low as possible, the chip surface is kept as small as possible. Because the length of the spine (i.e., the extent of the spine in a direction along a straight line drawn through the two memory bank access devices illustrated in FIG. 2) is determined by the arrangement of the memory banks, reducing the area of the spine is possible only if the width of the spine, (i.e., the distance between the upper memory banks and the lower memory banks) is minimised. For reasons of timing behaviour, in one embodiment time-critical devices are advantageously arranged in a central area of the spine, so that the width of the spine is decisively determined by the chip surface requirement by the devices which are arranged in the central area of the spine.

An embodiment of a memory arrangement includes an interface for transmitting data in the form of data packets according to a predefined protocol, at least two memory banks each with at least one memory cell, at least two memory bank access devices, via which access to the data of the at least one memory cell of the at least two memory banks takes place, and at least two data packet processing devices which are suitable for encoding and decoding data packets. The at least two data packet processing devices are assigned to different memory bank access devices.

Since at least two data packet processing devices are provided on the memory arrangement in this embodiment, and these can be arranged adjacently to the memory bank access devices, which are arranged outside a central area of the spine, less chip surface can be required in the central area of the spine. In this way this central area of the spine may become usable for other devices, which for instance can be arranged in the central area of the spine because of their timing behaviour. Since in one embodiment, the width of the spine is decisively determined by the chip surface which is required in the central area of the spine, by the arrangement according to embodiments of the data packet processing devices the width of the spine can be reduced. Also, by this arrangement embodiment, the number of connecting lines which are arranged within the spine can be reduced, so that in turn a less wide spine employed.

According to an embodiment, the memory arrangement may have an even number of memory banks, a first memory bank access device and a second memory bank access device. An access to the memory cells of a first half of the memory banks takes place via the first memory bank access device, and an access to the memory cells of a second half of the memory banks takes place via the second memory bank access device. With a correspondingly symmetrical arrangement, the requirements for timing behaviour can be fulfilled very well.

According to an embodiment, two data packet processing devices and two memory bank access devices can be provided on the memory arrangement. A first of the memory bank access devices is arranged approximately in the center of a first half of the length of the spine, and a second of the memory bank access devices is arranged approximately in the center of a second half of the length of the spine. A first of the two data packet processing devices is arranged in an area between a central area of the spine and the first memory bank access device, and a second of the two data packet processing devices is arranged in an area between the central area of the spine and the second memory bank access device. Because of the arrangement adjacent to the memory bank access devices, no chip surface is employed for the data packet processing devices in the central area of the spine, so that a less wide spine is employed.

According to an embodiment, the memory arrangement can have multiple memory banks, which are accessible via multiple memory bank access devices. In this case, for each of the memory bank access devices, via one memory bank access device it is possible to access memory cells of one or more memory banks. On the other hand, access to memory cells of a particular memory bank is possible only from exactly one memory bank access device. Thus, multiple memory banks can be assigned to one memory bank access device, but one memory bank cannot be assigned to different memory bank access devices.

In an embodiment, the memory arrangement can have a temporary storage device for temporary storage of data. The temporary storage device is connected via connecting lines to the at least two data packet processing devices and the at least two memory bank access devices. If the temporary storage device is used, write data is not transmitted directly from the data packet processing devices to the memory bank access devices, but first transmitted to the temporary storage device, and from there, decoupled in time, stored via the memory bank access devices into the memory banks. The data packet processing devices are then immediately ready to process further data packets. Analogously, read data can be stored from the memory banks into the temporary storage device via the memory bank access devices because of a read command, independently in time, and fetched from there by the data packet processing devices and processed further. In the case of processing read commands too, the data packet processing devices do not have to wait for the read command to be completely processed, but can immediately process further data packets. In this way, the system power can be significantly increased.

An embodiment of the memory arrangement can also have two or more temporary storage devices. For instance, the at least two temporary storage devices can then each be assigned to a memory bank access device or a data packet processing device.

The memory arrangement according to an embodiment is used, in particular, for dynamic random access memory (DRAM) memory components on a common chip. The invention is not restricted to this application, but can also be used in read only memory (ROM) memory components or other suitable memory components.

According to an embodiment, a memory arrangement can be used, for example, in a computer system as a read-write memory or DRAM memory arrangement.

Hereinafter, embodiments are described in more detail with reference to the drawings. The description first refers only to the receiving and decoding of data packets and thus to the receiving and processing of write data, addressing data, and command data. Read data is processed similarly, and is described briefly at the end of the description.

Figure 1:
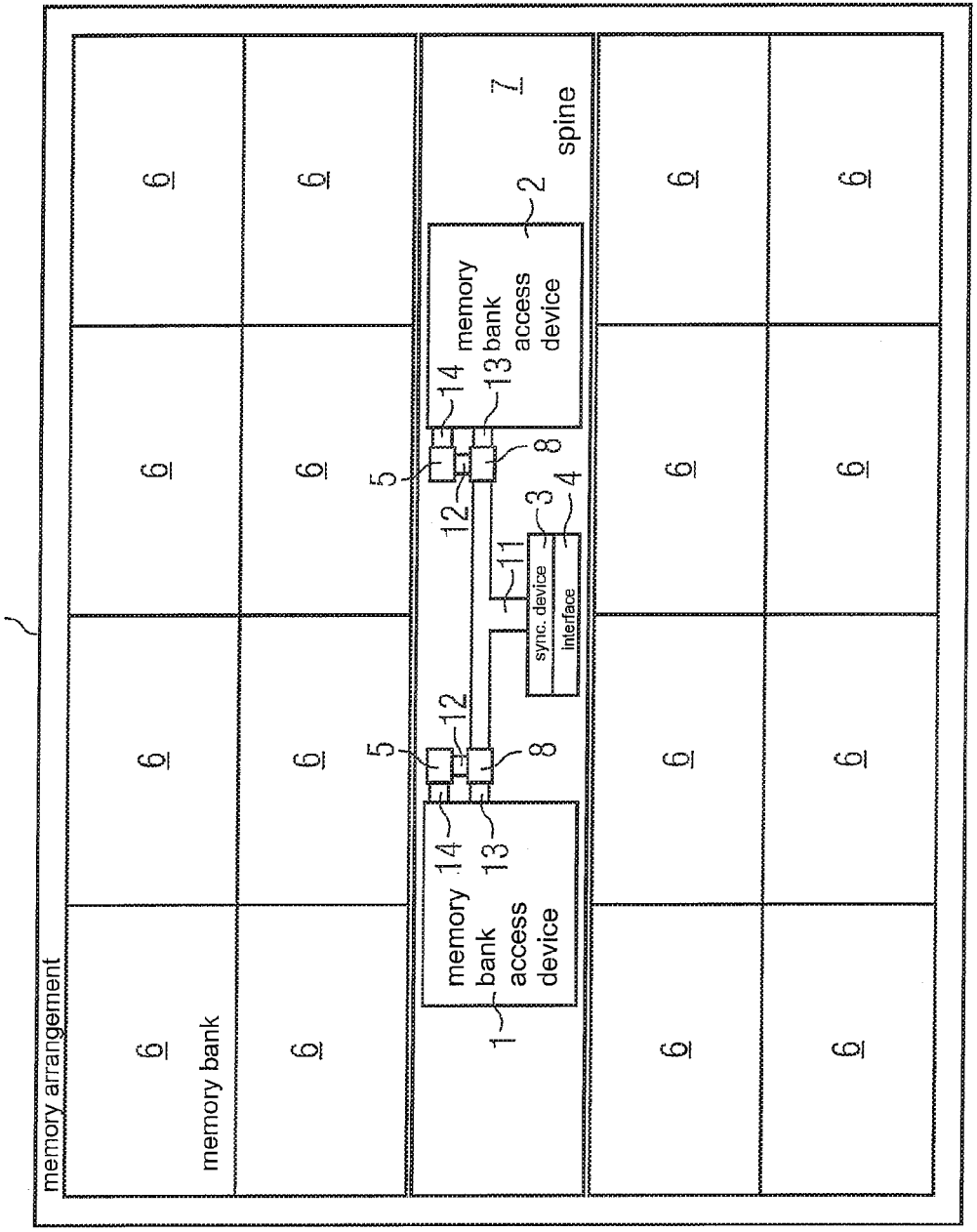
FIG. 1 is a plan view of one embodiment of a memory arrangement, with two data packet processing devices.

FIG. 1 illustrates schematically an embodiment of a memory arrangement 10, with an even number of memory banks 6, a first and a second memory bank access device 1 and 2, a first and a second data packet processing device 8, a first and a second temporary storage device 5, a synchronisation device 3 and an interface 4. Regarding the synchronisation device 3 and interface 4, reference can be made to FIG. 3 and the preceding explanations of it.

The sixteen memory banks 6 are divided into two areas as follows. As FIG. 1 illustrates, in an upper area eight memory banks 6 are arranged, and in a lower area eight further memory banks 6 are arranged. The upper area is arranged at a distance from the lower area. Between the upper area and the lower area, there is a narrow strip-shaped area 7, also referred to as a spine. The sixteen memory banks 6 are also divided into a left-hand group and a right-hand group. The left-hand group includes the eight memory banks 6, which are arranged on the left in FIG. 1, and the right-hand group includes the eight memory banks 6, which are arranged on the right-hand side in FIG. 1.

An access to memory cells of a memory bank 6 of the left-hand group takes place via the first memory bank access device 1, and an access to memory cells of the right-hand group of memory banks 6 takes place via the second memory bank access device 2. The first memory bank access device 1 is arranged in a center of a left-hand half of the spine 7. The second memory bank access device 2 is arranged in a center of a right-hand half of the spine.

In an area of the spine 7 between the first memory bank access device 1 and the second memory bank access device 2, the temporary storage devices 5 and data packet processing devices 8 are arranged in such a way that the first temporary storage device 5 and first data packet processing device 8 are arranged between the central area of the spine and the first memory bank access device 1, adjacently to the first memory bank access device 1, and that the second temporary storage device 5 and second data packet processing device 8 are arranged between the central area of the spine and the second memory bank access device 2, adjacently to the second memory bank access device 2. The interface 4 and synchronisation device 3 are substantially arranged in the center of the spine 7.

The memory arrangement 10 is controlled, (e.g., from a computer system) via data packets which are transmitted between the computer system and the interface 4 of the memory arrangement. The data packet processing devices 8 of the memory arrangement 10 can be in such a form that the data packet processing devices 8 can encode and/or decode write data, read data, addressing data and command data in the form of data packets. The data packets can be structured in such a way that a data packet consists of a specified number of bits, which are transmitted via multiple parallel lines. The number of parallel lines can be clearly less than the number of bits of a data packet, in that multiple successive bit groups are transmitted via the parallel lines and then combined into a data packet. Thus, for example, data packets with a length of 54 bits can be transmitted via six lines, in nine successive six-bit groups. When data is received (e.g., from a computer system) the interface 4 synchronizes itself on the for instance six data streams of the six connecting lines to the computer system, and passes on the received six-bit groups to the synchronisation device 3. The synchronisation device 3 synchronizes itself on the 54-bit data packet structure, and forms a 54-bit data packet out of every nine received six-bit groups, the 54-bit data packet being transmitted via 54 lines in an area 11 to the two data packet processing devices 8. The data packet processing devices 8 decode the data packets, and control the temporary storage devices 5 and/or the memory bank access devices 1, 2 depending on the content of the data packets. The advantage of this transmission method is that fewer lines are employed between, for instance, the computer system and the memory arrangement. Each individual line is suitable for transmitting the significantly higher data rate.

In contrast to the memory arrangement embodiment illustrated in FIG. 2, in the memory arrangement embodiment illustrated in FIG. 1 considerably less chip surface is employed in a central area of the spine. Whereas in the memory arrangement in FIG. 2, the interface 4, the synchronisation device 3, the data packet processing device 8 and the temporary storage device 5 are still arranged in the center of the spine, in FIG. 1 only the synchronisation device 3 and the interface 4 are arranged in the center of the spine. Also, the chip surface for the required connecting lines in the spine can be significantly reduced by an arrangement embodiment illustrated in FIG. 1. In an embodiment, there are 54 connecting lines in an area 11 between the synchronisation device 3 and the data packet processing devices 8. In areas 13 between the data packet processing devices 8 and the memory bank access devices 1, 2, there are, for example, in each case 53 lines for transmitting address and control signals. In areas 14 between the temporary storage devices 5 and the memory bank access devices 1, 2, there are, for example, in each case 72 lines for transmitting write/read data and masking data. The connecting lines in areas 12 between the temporary storage devices 5 and the data packet processing devices 8 have no effect on the width of the spine, since in each case the temporary storage device 5 and data packet processing device 8 are arranged adjacently, and thus the connecting lines in the area 12 between them are extremely short.

Whereas, in the memory arrangement embodiment illustrated in FIG. 2, 125 lines (72 lines of area 14 and 53 lines of area 13) are arranged from the center of the spine to the memory bank access devices 1 and 2, in a memory arrangement embodiment illustrated in FIG. 1 only 54 lines of the area 11 are arranged from the center of the spine in the direction of the memory bank access devices 1 and 2. In this way, a considerable part of the chip surface of the spine can be saved, and thus the width of the spine can be reduced.

Instead, the data packet processing device 8 is now arranged twice within the spine. However, since the two data packet processing devices 8 are arranged near the memory bank access devices 1, 2 and thus employ no chip surface in the central area of the spine, this has no negative effect on the width of the spine. The presence of two temporary storage devices 5 also has no negative effect on the width of the spine, because the temporary storage devices are not duplicated, but can be divided in such a way that data of the first memory bank access device 1 is stored temporarily only in the first temporary storage device 5, which is arranged adjacently to the first memory bank access device 1, and that data of the second memory bank access device 2 is stored temporarily only by the second temporary storage device 5, which is arranged adjacently to the second memory bank access device 2. Thus the chip surface of a single temporary storage device 5 of FIG. 1 corresponds approximately to half the chip surface of the temporary storage device 5 of FIG. 2.

By the symmetrical division of the temporary storage device 5 and the symmetrical duplication of the data packet processing device 8, the memory arrangement embodiment illustrated in FIG. 1 fulfils all requirements for the timing behaviour of the memory arrangement.

Figure 4:
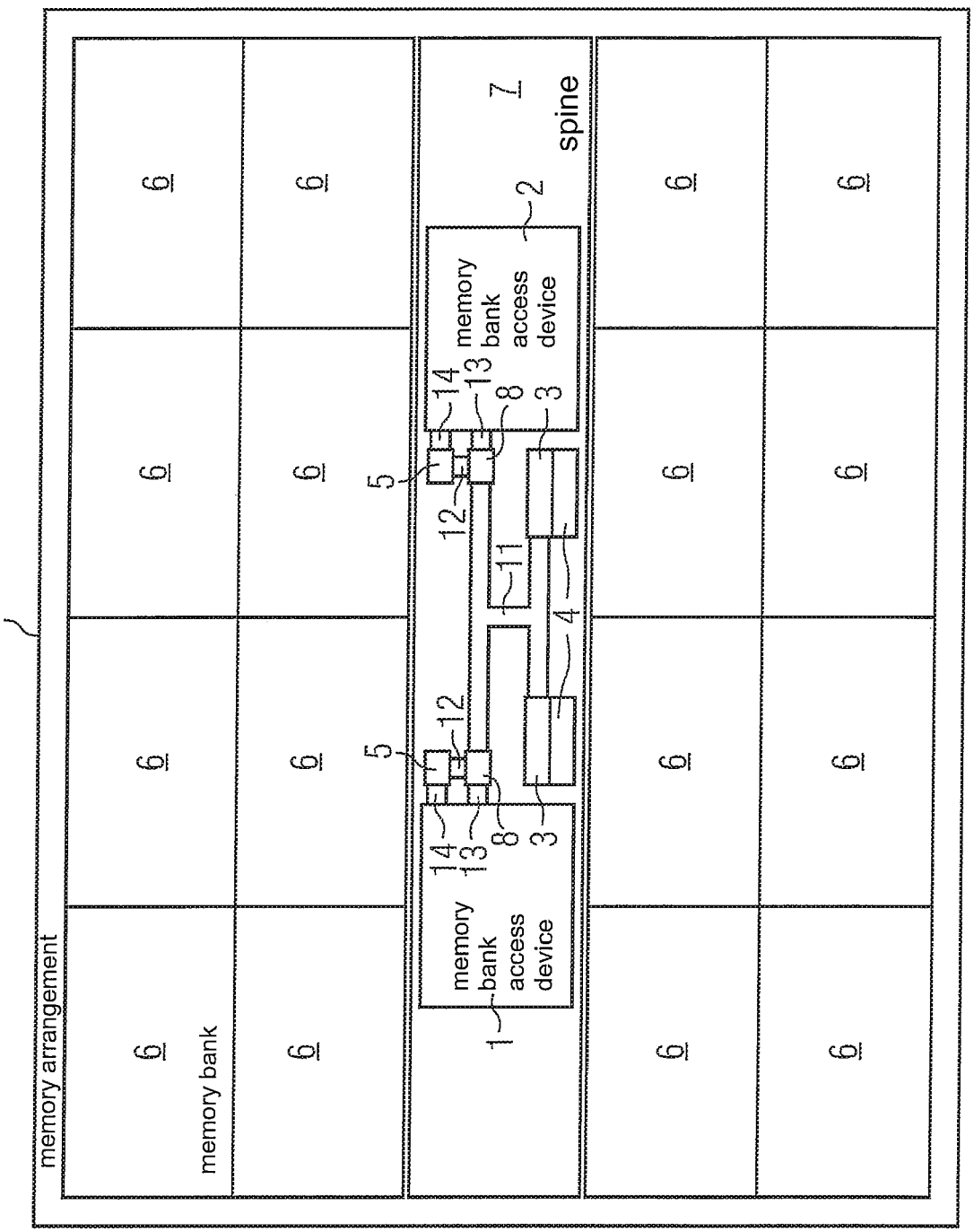
FIG. 4 illustrates schematically a plan view of one embodiment of the memory arrangement, with two data packet processing devices, two interfaces and two synchronisation devices.

FIG. 4 illustrates an embodiment of a memory arrangement 10, with two interfaces 4 and two synchronisation devices 3, which are each arranged adjacently to a memory bank access device 1 and 2 respectively. The embodiment illustrated in FIG. 4 largely corresponds to the embodiment illustrated in FIG. 1. Therefore, corresponding descriptions of FIG. 1 also apply to FIG. 4.

As described above, the memory arrangement 10 can be controlled by, for example, a computer system via multiple lines, for instance six lines, via which the data packets are transmitted. In this case, the interface 4 has six connections for connecting the six lines. These six connections can be divided, for example, into two connection groups each of three connections. As FIG. 4 illustrates, a first of the connection groups, together with a first part of the interface 4 and a first part of the synchronisation device 3, is arranged in an area between the central area of the spine 7 and the first memory bank access device 1. Correspondingly, a second of the connection groups, together with a second part of the interface 4 and a second part of the synchronisation device 3, is arranged in an area between the central area of the spine 7 and the second memory bank access device 2. The first part of the interface 4 and the first part of the synchronisation device 3 synchronize and parallelize or serialize the data which is transmitted via the first connection group. The second part of the interface 4 and the second part of the synchronisation device 3 synchronize and parallelize or serialize the data which is transmitted via the second connection group. Via connecting lines in the area 11, the synchronisation devices 3 and data packet processing devices 8 are connected in such a way that each of the data packet processing devices 8 is connected to both synchronisation devices 3.

By such an arrangement of the interface 4 and synchronisation device 3, these devices employ no chip surface in the central area of the spine, so that the width of the spine can be reduced.

The previously explained data packet processing devices 8 can also be used in association with the arrangement according to embodiments of the data packet processing devices 8, to read data out of the memory banks 6. For instance, data packet processing devices 8 which are arranged between memory bank access devices 1 and 2 and a synchronisation device 3, which is designed to transmit, encode and decode read data, addressing data and command data, can, on the basis of a read request, read out read data from the memory banks 6 via the memory bank access devices 1 and 2, encode it and pass it on to the synchronisation device 3 for further processing. The synchronisation device 3 serializes the data packets and sends the serialized data to the interface 4, which transmits the serialized data to the computer system.

Although the embodiment of the invention described in FIG. 1 illustrates a memory arrangement 10 with two data packet processing devices 8, two memory bank access devices 1, 2 and two temporary storage devices 5, any other combinations with two or more data packet processing devices 8, two or more memory bank access devices 1, 2 and optionally one or more temporary storage devices 5 are conceivable.

As described above, the embodiments described above with reference to the figures may be each realized in a dedicated chip or any combination of the embodiments described above may be realized within one chip combining the functionality and characteristics of these embodiments. It is also understood that all the embodiments described above are considered to be comprised by the present invention as it is defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory arrangement, comprising:
   an interface configured to transmit data in the form of data packets according to a predefined protocol;
   at least two memory banks, each memory bank including at least one memory cell;
   at least two memory bank access devices configured to facilitate accessing the data of the at least one memory cell of each of the at least two memory banks;
   at least two data packet processing devices configured to encode and/or decode the data packets, wherein the at least two data packet processing devices are assigned to different memory bank access devices; and
   two temporary storage devices configured to temporary store data, wherein a first of the temporary storage devices is arranged in an area extending from a center between a first of the memory bank access devices and a second of the memory bank access devices in a direction of the first memory bank access device, and a second of the temporary storage devices is arranged in an area extending from the center between the first memory bank access device and the second memory bank access device in a direction of the second memory bank access device.

2. The memory arrangement according to claim 1, wherein each of the at least two data packet processing devices is connected to the interface and to at least one of the at least two memory bank access devices.

3. The memory arrangement according to claim 1, wherein the at least two data packet processing devices are configured to encode and/or decode read data and/or write data, addressing data, and command data.

4. The memory arrangement according to claim 1, wherein the interface is configured to transmit serialized data packets, and the memory arrangement comprises:
   a synchronization device configured to:
      receive the data packets from the interface, parallelize and synchronize the received data packets, and output the parallelized and synchronized data packets to the at least two data packet processing devices; and
      receive data packets from the at least two data packet processing devices, serialize data packets to be transmitted, and output the serialized data packets to the interface.

5. The memory arrangement according to claim 4, wherein the interface comprises at least two connections to transmit the data in the form of data packets according to the predefined protocol;
    wherein a first part of the interface including a first part of the at least two connections and a first part of the synchronisation device configured to parallelize and synchronize the data received via the first part of the interface and to serialize the data to be transmitted via the first part of the interface, are arranged in an area extending from a center between a first of the memory bank access devices and a second of the memory bank access devices in a direction of the first memory bank access device; and
    wherein a second part of the interface including a second part of the at least two connections and a second part of the synchronisation device configured to parallelize and synchronize the data received via the second part of the interface and to serialize the data to be transmitted via the second part of the interface, are arranged in an area extending from the center between the first memory bank access device and the second memory bank access device in a direction of the second memory bank access device.

6. The memory arrangement according to claim 1, comprising:
    at least one temporary storage device configured to temporary store data transmitted between the at least two data packet processing devices and the least two memory bank access devices.

7. The memory arrangement according to claim 1, comprising:
    at least two temporary storage devices configured to temporary store data transmitted between the at least two data packet processing devices and the least two memory bank access devices, wherein each of the at least two temporary storage devices is connected to one of the at least two data packet processing devices and to one of the at least two memory bank access devices.

8. The memory arrangement according to claim 1, wherein the memory arrangement is configured such that for each memory cell of the at least two memory banks, an access to a specified memory cell takes place only via exactly one of the at least two memory bank access devices.

9. The memory arrangement according to claim 1, wherein the memory arrangement is configured such that an access to memory cells which are arranged in different memory banks takes place via a memory bank access device.

10. The memory arrangement according to claim 1, wherein the memory arrangement comprises an even number of memory banks, and two memory bank access devices, wherein the memory arrangement is configured such that an access to memory cells of a first half of the memory banks takes place via the first memory bank access device, and such that an access to memory cells of a second half of the memory banks takes place via the second memory bank access device.

11. The memory arrangement according to claim 1, wherein the memory arrangement comprises two data packet processing devices, wherein:
    a first of the data packet processing devices is arranged in an area extending from a center between a first of the memory bank access devices and a second of the memory bank access devices in a direction of the first memory bank access device; and
    a second of the data packet processing devices is arranged in an area extending from the center between the first memory bank access device and the second memory bank access device in a direction of the second memory bank access device.

12. The memory arrangement according to claim 1, wherein the memory arrangement is configured such that:
    write data, which is to be stored in memory cells of a memory bank to which access is possible via the first memory bank access device, is stored temporarily only in the first temporary storage device; and
    write data, which is to be stored in memory cells of a memory bank to which access is possible via the second memory bank access device, is stored temporarily only in the second temporary storage device.

13. The memory arrangement according to claim 1, wherein each of the at least two data packet processing devices is arranged adjacent to a corresponding one of the at least two memory bank access devices.

14. The memory arrangement according to claim 1, wherein the interface, the at least two memory banks, the at least two memory bank access devices, and the at least two data packet processing devices are formed on a common chip.

15. The memory arrangement according to claim 1, wherein:
    the interface is configured to receive data;
    the at least two data packet processing devices are configured to decode write data, addressing data, and command data; and
    the at least two memory bank access devices are configured to store write data in the at least two memory banks; and
    the memory arrangement comprises at least two temporary storage devices configured to temporary store write data transmitted from one of the at least two data packet processing devices to the at least two memory bank access devices.

16. The memory arrangement according to claim 1, wherein:
    the at least two data packet processing devices are configured to encode and/or decode read data, addressing data, and command data; and
    the at least two memory bank access devices are configured to read out read data from the at least two memory banks.

17. A memory arrangement, comprising:
    means for transmitting data in the form of data packets according to a predefined protocol;
    at least two memory banks, each memory bank including at least one memory cell;
    means for facilitating access of the data of the at least one memory cell of the at least two memory banks; and
    at least two means for processing data packets to encode and/or decode the data packets, wherein the at least two means for processing data packets are assigned to different memory bank access devices, wherein a first of the means for processing data packets is arranged in an area extending from a center between a first of the means for facilitating access and a second of the means for facilitating access in a direction of the first means for facilitating access, wherein a second means for processing data packets is arranged in an area extending from the center between the first means for facilitating access and the second means for facilitating access in a direction of the second means for facilitating access.

18. The memory arrangement according of claim 17, wherein the predefined protocol comprises definitions defining read data packets, write data packets, address data packets, and command data packets, wherein the at least two means for processing data packets encode and/or decode read data and/or write data, address data, and command data.

19. A memory arrangement, comprising:
- an interface configured to transmit data in the form of data packets according to a predefined protocol;
- at least two memory banks, each memory bank including at least one memory cell;
- at least two memory bank access devices configured to facilitate accessing the data of the at least one memory cell of each of the at least two memory banks;
- at least two data packet processing devices configured to encode and/or decode the data packets, wherein the at least two data packet processing devices are assigned to different memory bank access devices; and
- at least two temporary storage devices configured to temporary store data transmitted between the at least two data packet processing devices and the least two memory bank access devices, wherein the at least two temporary storage devices comprise:
- a first temporary storage device arranged in an area extending from a center between a first of the memory bank access devices and a second of the memory bank access devices in a direction of the first memory bank access device; and
- a second temporary storage device arranged in an area extending from the center between the first memory bank access device and the second memory bank access device in a direction of the second memory bank access device.

20. The memory arrangement according to claim 19, wherein:
- write data, which is to be stored in memory cells of a memory bank which is accessed via the first memory bank access device, is stored temporarily only in the first temporary storage device; and
- write data, which is to be stored in memory cells of a memory bank which is accessed via the second memory bank access device, is stored temporarily only in the second temporary storage device.

21. A memory arrangement, comprising:
- an interface configured to transmit data in the form of data packets according to a predefined protocol;
- at least two memory banks, each memory bank including at least one memory cell;
- at least two memory bank access devices configured to facilitate accessing the data of the at least one memory cell of each of the at least two memory banks; and
- at least two data packet processing devices configured to encode and/or decode the data packets, wherein the at least two data packet processing devices are assigned to different memory bank access devices, wherein a first of the data packet processing devices is arranged in an area extending from a center between a first of the memory bank access devices and a second of the memory bank access devices in a direction of the first memory bank access device, wherein a second of the data packet processing devices is arranged in an area extending from the center between the first memory bank access device and the second memory bank access device in a direction of the second memory bank access device.

22. The memory arrangement according to claim 21, wherein the interface is configured to transmit serialized data packets, and the memory arrangement comprises:
- a synchronization device configured to:
  - receive the data packets from the interface, parallelize and synchronize the received data packets, and output the parallelized and synchronized data packets to the at least two data packet processing devices; and
  - receive data packets from the at least two data packet processing devices, serialize data packets to be transmitted, and output the serialized data packets to the interface.

23. A computer system comprising:
- a data processing unit; and
- a memory arrangement comprising:
  - an interface configured to transmit data in the form of data packets according to a predefined protocol, wherein the memory arrangement is connected to the data processing unit via the interface;
  - at least two memory banks, each memory bank including at least one memory cell;
  - at least two memory bank access devices configured to facilitate accessing the data of the at least one memory cell of each of the at least two memory banks;
  - at least two data packet processing devices configured to encode and/or decode the data packets; and
  - two temporary storage devices configured to temporary store data, wherein a first of the temporary storage devices is arranged in an area extending from a center between a first of the memory bank access devices and a second of the memory bank access devices in a direction of the first memory bank access device, and a second of the temporary storage devices is arranged in an area extending from the center between the first memory bank access device and the second memory bank access device in a direction of the second memory bank access device.

* * * * *